(12) United States Patent
Zhou

(10) Patent No.: US 11,951,494 B2
(45) Date of Patent: *Apr. 9, 2024

(54) WATER OUTLET DEVICE

(71) Applicants: Xiamen Water Nymph Sanitary Technology Co., Ltd., Xiamen (CN); Huaqiang Zhou, Xiamen (CN)

(72) Inventor: Huaqiang Zhou, Xiamen (CN)

(73) Assignees: Xiamen Water Nymph Sanitary Technology Co., Ltd., Xiamen (CN); Huaqiang Zhou, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,854

(22) Filed: Mar. 16, 2023

(65) Prior Publication Data

US 2023/0211361 A1 Jul. 6, 2023

Related U.S. Application Data

(63) Continuation of application No. 17/133,962, filed on Dec. 24, 2020, now Pat. No. 11,628,453.

(30) Foreign Application Priority Data

Jan. 6, 2020 (CN) .......................... 202020017196.6

(51) Int. Cl.
*B05B 1/18* (2006.01)
*E03C 1/04* (2006.01)
*E03C 1/084* (2006.01)

(52) U.S. Cl.
CPC ............ *B05B 1/185* (2013.01); *E03C 1/0404* (2013.01); *E03C 1/084* (2013.01); *E03C 1/0408* (2013.01); *E03C 2001/0414* (2013.01)

(58) Field of Classification Search
CPC ..... B05B 1/185; E03C 1/0404; E03C 1/0408; E03C 1/084; E03C 1/086; E03C 2001/0414
USPC ... 4/675, 567, 584, 596, 615, 624, 653, 668, 4/671, 676, 677, 678; 137/615, 800, 801, 137/861; 251/153, 155, 340, 349
See application file for complete search history.

(56) References Cited

U.S. PATENT DOCUMENTS 4,360,160 A * 11/1982 Jette ...................... B05B 1/3026
239/289
4,398,668 A * 8/1983 Jette ...................... B05B 15/654
4/596

(Continued)

FOREIGN PATENT DOCUMENTS

CN 106694260 A * 5/2017
DE 202004016788 U1 * 1/2005 ............. B05B 1/185

*Primary Examiner* — Lori L Baker
(74) *Attorney, Agent, or Firm* — Westbridge IP LLC

(57) ABSTRACT

A water outlet device includes a ball component. The ball component comprises an arc ball rod and a ball. Two water ports and a water channel located between the two water ports are formed in the arc ball rod. An angle is formed between the directions of the two water ports. The ball is arranged on at least one water port. The water channel penetrates through the ball. The two water ports having an angle formed between water flow directions thereof are formed in the water channel of the arc ball rod, so that the water outlet direction of the water outlet device can be adjusted to be upward, and the water outlet angle can be adjusted to some extent.

8 Claims, 1 Drawing Sheet

(56) References Cited

U.S. PATENT DOCUMENTS

| | | | |
|---|---|---|---|
| 2006/0200904 A1* | 9/2006 | Vogel | E03C 1/0402 4/695 |
| 2009/0139024 A1* | 6/2009 | Vogel | E03C 1/2302 137/15.01 |
| 2015/0351592 A1* | 12/2015 | Braic | A47K 5/1214 4/675 |
| 2018/0058050 A1* | 3/2018 | Wu | G01F 15/06 |
| 2021/0148099 A1* | 5/2021 | Zhou | F16K 31/58 |

* cited by examiner

WATER OUTLET DEVICE

CROSS-REFERENCE TO RELATED APPLICATIONS

This is a continuation application of U.S. application Ser. No. 17/133,962 filed on Dec. 24, 2020, which claims priority to Chinese patent application CN 202020017196.6, filed on Jan. 6, 2020, the entire contents of which are incorporated herein by reference.

TECHNICAL FIELD

The application relates to the technical field of bath products, in particular to a water outlet device.

BACKGROUND

Existing water outlet devices provided with a ball are typically designed in such a manner that the ball is rotatably connected to a water outlet end or a water inlet end to change the water outlet direction to some extent. Before using water to rinse their mouth or wash their face in daily life, users have to receive water from the water outlet devices with the ball, which is extremely inconvenient.

SUMMARY

The technical issue to be settled by the application is to provide a water outlet device which is able to discharge water upwards and downwards.

To settle the aforesaid technical issue, the technical solution adopted by the application is as follows: a water outlet device comprises a ball component, the ball component comprises an arc ball rod and a ball, two water ports and a water channel located between the two water ports are formed in the arc ball rod, and an angle is formed between the directions of the two water ports.

The ball is arranged on at least one of the water ports, and the water channel penetrates through the ball.

The water outlet device may further comprise a water outlet component, and the ball is arranged in the water outlet component and is rotatably connected to the water outlet component.

The water outlet component may be a bubbler.

The water outlet device may further comprise a connecting piece, the ball is arranged on one of the two water ports, and the connecting piece is arranged on the other water port.

Balls may be arranged on the two water ports respectively.

The water outlet device may further comprise a connecting piece, and any one of the balls is arranged in the connecting piece and is rotatably connected to the connecting piece.

The angle between the directions of the two water ports may range from 30° to 150°.

The water channel is an arc water channel, the arc water channel is coaxial with a central axis of the arc ball rod.

The application has the following beneficial effects: two water ports having an angle formed between the water flow directions thereof are formed in the water channel of the ball rod, and a first ball is arranged on a first ball rod and is rotatably connected to a water supply device or a water outlet component, so that the water outlet direction of the water outlet device can be adjusted to be upward, and the water outlet angle can be adjusted to some extent.

DETAILED DESCRIPTION OF THE EMBODIMENTS

The technical contents, purposes and effects of the application will be described in detail below in conjunction with the embodiments and accompanying drawings.

The key concept of the application lies in that two water ports having an angle formed between water flow directions thereof are formed in a water channel to allow the water outlet direction of a water outlet device to be adjusted to be upward.

Figure 1:
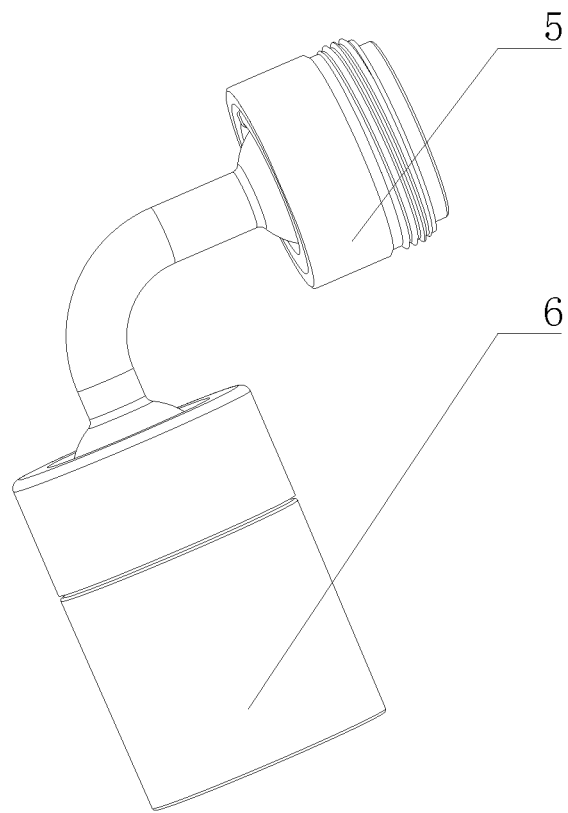
FIG. 1 is a structural view of a water outlet device in an embodiment of the application.
Figure 2:
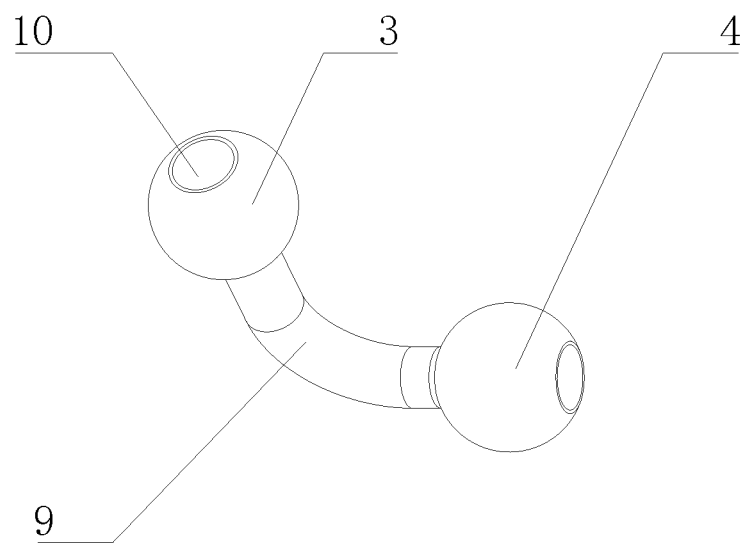
FIG. 2 is a structural view of a ball component in FIG. 1.

Referring to FIG. 1 to FIG. 2, a water outlet device, comprising a ball component, wherein the ball component comprises an arc ball rod and a ball, two water ports and a water channel located between the two water ports are formed in the arc ball rod, and an angle is formed between directions of the two water ports.

The ball is disposed on at least one of the water ports, and the water channel penetrates through the ball.

From the above description, the application has the following beneficial effects: the two water ports having an angle formed between the water flow directions thereof are formed in the water channel of the ball rod, and a first ball is arranged on a ball rod and is rotatably connected to a water supply device or a water outlet component, so that the water outlet direction of the water outlet device can be adjusted to be upward, and the water outlet angle can be adjusted to some extent.

The water outlet device may further comprise a water outlet component, and the first ball is arranged in the water outlet component and is rotatably connected to the water outlet component.

From the above description, the first ball is arranged in the water outlet component, so that the water outlet direction of the water outlet component can be adjusted by means of the rotation of the first ball.

The water outlet component may be a bubbler.

The water outlet device may further comprise a connecting piece arranged at the other end of the ball rod.

From the above description, the connecting piece is arranged at the other end of the ball rod, and the connecting piece and the first ball are separately connected to the water outlet component and the water supply device and are separately used as a water inlet end and a water outlet end of the water outlet device.

A second ball may be arranged at the other end of the ball rod, and the water channel penetrates through the second ball.

From the above description, the second ball is arranged at the other end of the ball rod, and the first ball and the second ball can be separately connected to the water supply device and the water outlet component and are separately used as a water inlet end and a water outlet end of the water outlet device, so that bidirectional rotation of the ball rod can be realized, and the water outlet direction can be selected more flexibly.

The water outlet device may further comprise a connecting piece, and one of the first ball and the second ball is arranged in the connecting piece and is rotatably connected with the connecting piece.

From the above description, either the first ball or the second ball is arranged in the connecting piece and can be connected to the water outlet component through the connecting piece to serve as a water outlet end of the water outlet device or be connected to the water supply device to serve as a water inlet end of the water outlet device.

The angle between the directions of the two water ports may range from 30° to 150°.

From the above description, the angle between the water flow directions of the two water ports ranges from 30° to 150°, so that the water outlet direction of the water outlet device can be adjusted to be more suitable for the using habits of customers; in addition, when the water outlet direction of the water outlet device is adjusted to be upward, discharged water can be prevented from splashing.

The water channel is an arc water channel, the arc water channel is coaxial with a central axis of the arc ball rod.

Referring to FIG. 1 and FIG. 2, the ball rod comprises an arc ball rod 9, a first ball 3 and a second ball 4. Two water ports and an arc water channel 10 located between the two water ports are sequentially formed in the arc ball rod 9, and a 90° angle is formed between the directions of the two water ports.

The first ball 3 and the second ball 4 are disposed on the two water ports respectively, and the arc water channel 10 penetrates through the first ball 3 and the second ball 4.

The arc water channel 10 is coaxial with the central axis of the arc ball rod 9.

The connecting piece 5 is a hollow structure having two ends formed with openings, and the second ball 4 is disposed in the connecting piece 5 through an annular sealing element and is able to rotate in a cavity defined by the connecting piece 5 and the sealing element.

The water outlet component 6 is a bubbler, and the first ball 3 is disposed in the bubbler through an annular sealing element and is able to rotate in a cavity defined by the bubbler and the sealing element.

The connecting piece 5 is communicated with a water outlet end of a water supply device.

To sum up, according to the water outlet device, that can discharge water upwards, two water ports having an angle formed between water flow directions thereof are formed in a water channel of a ball rod, and a first ball and a second ball are separately arranged at two ends of the ball rod and are rotatably arranged in a water supply device and a water outlet component, so that the water outlet direction of the water outlet device can be adjusted to be upward, and the water outlet angle can be adjusted to some extent.

The above description is merely used to explain the embodiments of the application, and is not intended to limit the patent scope of the application. All equivalent transformations made according to the contents of the specification and the accompanying drawings, or direct or indirect applications to relating technical fields should also fall within the patent protection scope of the application.

What is claimed is:

1. A water outlet device, comprising a ball component, wherein the ball component comprises an arc ball rod and a ball, two water ports and a water channel located between the two water ports are formed in the arc ball rod, and an angle is formed between directions of the two water ports;

the ball is arranged on at least one of the water ports, and the water channel penetrates through the ball.

2. The water outlet device according to claim 1, further comprising a water outlet component, wherein the ball is arranged in the water outlet component and is rotatably connected to the water outlet component.

3. The water outlet device according to claim 2, wherein the water outlet component is a bubbler.

4. The water outlet device according to claim 1, further comprising a connecting piece, wherein the ball is arranged on one of the two water ports, and the connecting piece is arranged on the other water port.

5. The water outlet device according to claim 1, wherein balls are arranged on the two water ports respectively.

6. The water outlet device according to claim 5, further comprising a connecting piece, and any one of the balls is arranged in the connecting piece and is rotatably connected to the connecting piece.

7. The water outlet device according to claim 1, wherein the angle between the directions of the two water ports ranges from 30° to 150°.

8. The water outlet device according to claim 1, wherein the water channel is an arc water channel, the arc water channel is coaxial with a central axis of the arc ball rod.

* * * * *